United States Patent [19]

Matsushita

[11] Patent Number: 4,807,983
[45] Date of Patent: Feb. 28, 1989

[54] PHOTOGRAPHIC LENS OF EXTENDED FOCUSING RANGE WITH IMPROVED STABILITY OF PICTURE QUALITY

[75] Inventor: Takashi Matsushita, Kanagawa, Japan

[73] Assignee: Canon Kabushiki Kaisha, Tokyo, Japan

[21] Appl. No.: 7,621

[22] Filed: Jan. 28, 1987

[30] Foreign Application Priority Data

Jan. 30, 1986 [JP] Japan ................................ 61-018929
Jan. 30, 1986 [JP] Japan ................................ 61-018932

[51] Int. Cl.$^4$ .............................................. G02B 9/64
[52] U.S. Cl. ..................................... 350/463; 350/464
[58] Field of Search ............... 350/423, 427, 463, 464, 350/450

[56] References Cited

U.S. PATENT DOCUMENTS 4,306,776 12/1981 Someya ................................ 350/427
4,466,710 8/1984 Kato et al. ........................... 350/464

Primary Examiner—John K. Corbin
Assistant Examiner—Scott J. Sugarman
Attorney, Agent, or Firm—Fitzpatrick, Cella, Harper & Scinto

[57] ABSTRACT

A photographic lens comprising four lens units, of which the first and second counting from front are of positive power, and the third and fourth have powers of opposite sign to each other, wherein as focusing is performed from infinitely distant object to nearby object, the first three units are axially moved in such differential relation that all the three air separations between the successive two units increase, while the fourth lens unit is held stationary during focusing, thereby the picture quality for the nearby object is greatly improved.

17 Claims, 8 Drawing Sheets

PHOTOGRAPHIC LENS OF EXTENDED FOCUSING RANGE WITH IMPROVED STABILITY OF PICTURE QUALITY

BACKGROUND OF THE INVENTION

1. Field of the Invention

This invention relates to photographic lenses employing the floating method suited to cameras using photographic material, or video cameras, and more particularly to the extension of the focusing range in such a way as to well correct aberrations for high grade picture quality by using the floating method.

2. Description of the Related Art

In the cameras for photography and video cameras there have been objectives adapted mainly to shoot close objects. These objectives are usually called macro or micro lenses (hereinafter represented by "macro" lenses). The macro lenses are designed to have a high optical performance especially in the closeup range as compared with the other photographic objectives such as standard and telephoto ones. Also, the macro lenses, in many cases, are used even for objects ranging widely from nearby to infinitely distant ones.

In general, when the range of magnification of the macro lens is extended, particularly to the side of higher magnifications, variation of aberrations increases as the magnification varies. It becomes difficult to correct this well.

For example, the macro lens designed in respect to a reproduction ratio of 1/10 when used at a higher value of 1/5 produces very large spherical aberration, curvature of field and coma.

Besides this, when the effective F-number is decreased to make easier focusing, the range of variation of aberrations with variation of the magnification increases in proportion to the lens speed. It becomes difficult to correct this well.

Methods for correcting variation of aberrations with variation of the magnification over a range from an infinitely distant object to a nearby object have been proposed in, for example, Japanese Laid-Open patent applications Nos. SHO 48-90520, 50-138823, 52-7723, 55-28038 and 57-192916 (U.S. Pat. No. 4,553,823). Any of the photographic lenses disclosed in these documents has at least two lens units movable independently of each other when focusing, or utilizes the so-called "floating" technique. However, though each of these lenses is relatively well corrected for aberrations at a nearby object image of low magnification, the correction effect for high magnifications has not always been sufficient. For example, there was a tendency that coma is relatively well corrected at low magnifications, but, as the magnification increases, many aberrations such as distortion and chromatic aberrations are produced.

As another example of application of the floating technique to a closeup range of relatively low magnifications, there is U.S. Pat. No. 3,815,974.

SUMMARY OF THE INVENTION

An object of the present invention is to provide a photographic lens having a large relative aperture with a good stability of aberration correction throughout an extended focusing range and a high performance at images of magnification up to life-size or thereabout.

A second object is to well correct distortion and chromatic aberrations even in a range of high magnifications of life-size or thereabout.

Other objects and features of the invention will become apparent from the following detailed description of preferred embodiments thereof by reference to the drawings.

DETAILED DESCRIPTION OF THE PREFERRED EMBODIMENTS

Figure 1:
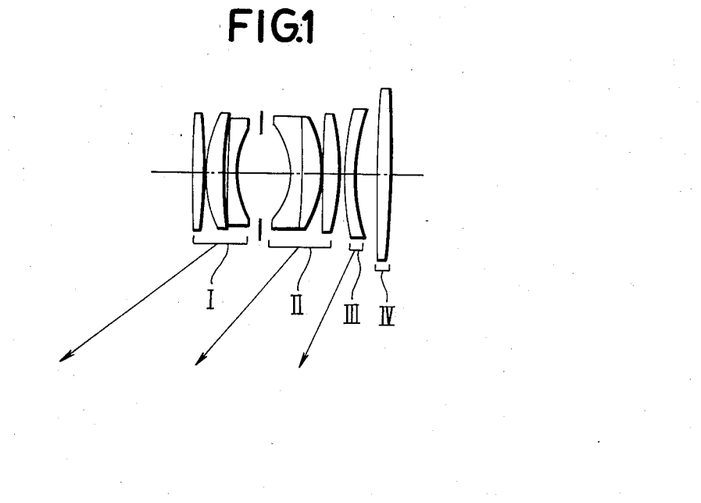
FIGS. 1 and 2 are longitidinal section views of numerical examples 1 and 3 of lenses of the invention respectively.
Figure 2:
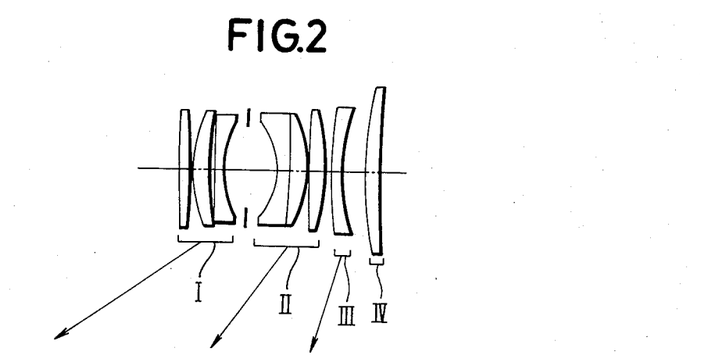
Figure 3A:
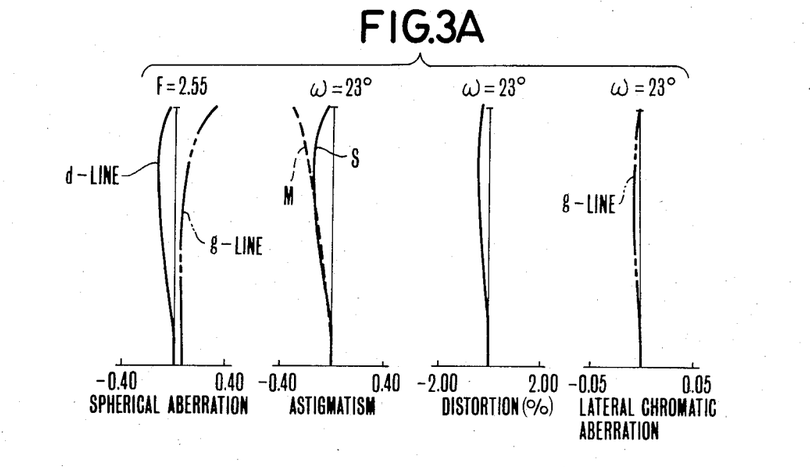
FIGS. 3A and 3B, 4A and 4B, and 5A and 5B are graphic representations of the aberrations of numerical examples 1, 2 and 3 of the invention respectively.
Figure 3B:
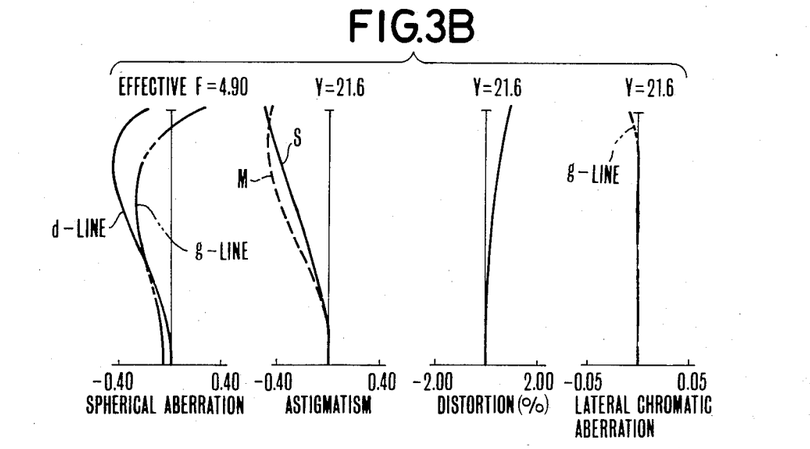
Figure 4A:
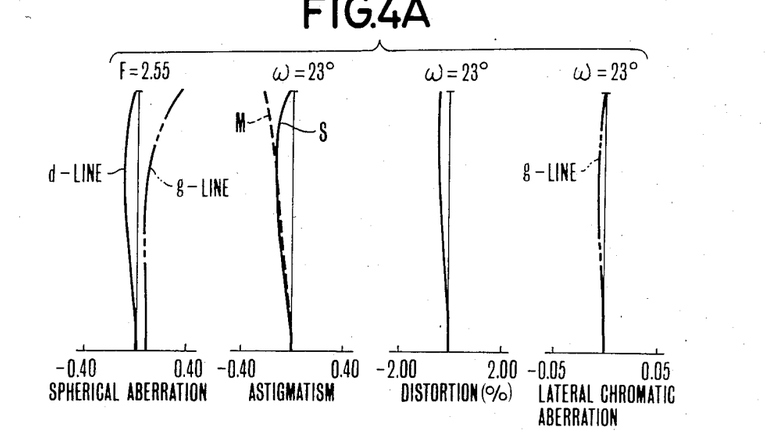
Figure 4B:
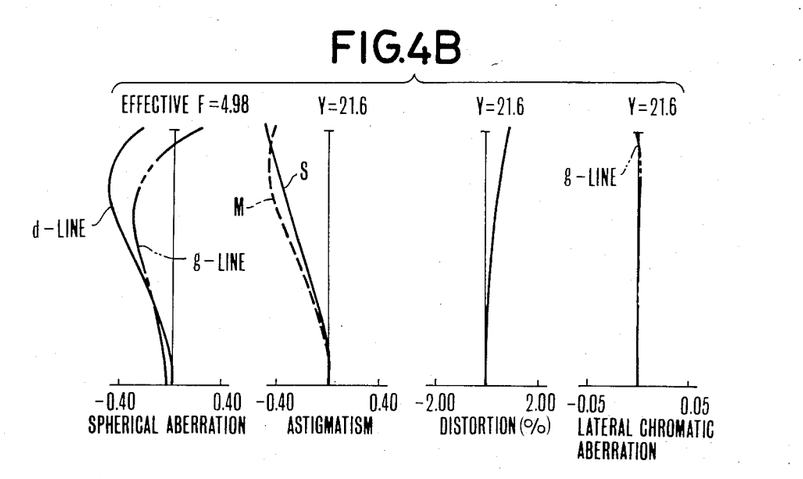
Figure 5A:
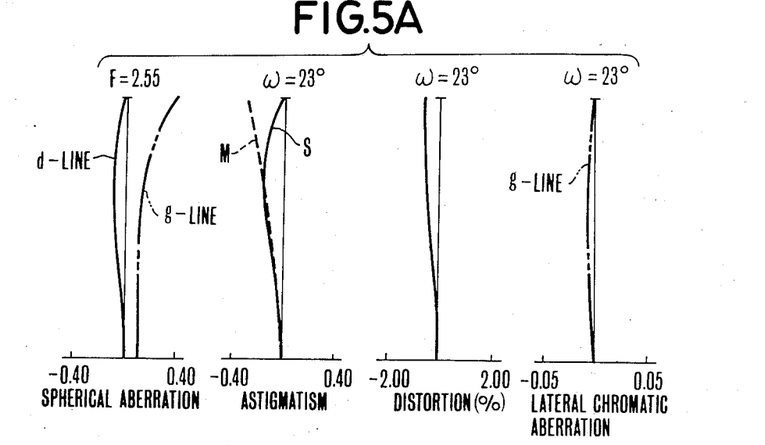
Figure 5B:
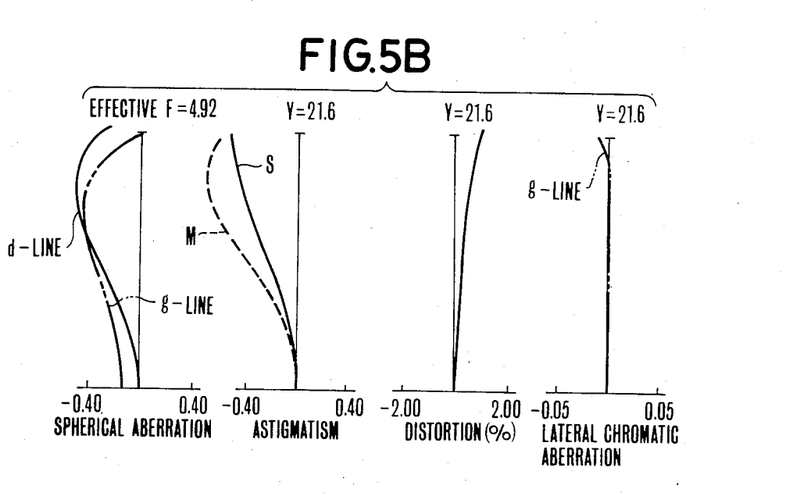

FIGS. 1 and 2 are lens block diagrams showing a first embodiment of the invention. In the drawings, I, II and III are the first, second and third lens units of positive, positive and negative powers respectively, and IV is the fourth lens unit of positive power. Also, arrows indicate directions in which the lens units move when focusing is performed from an infinitely distant object to a nearby object.

In this embodiment, as has been described above, on the object side there are arranged the first and second lens units each having a positive refractive power with a diaphragm therebetween, and, on the image side, there are arranged the third lens unit of negative refractive power, and the fourth lens unit of positive refractive power, thus constituting a Gauss type photographic lens with the four lens units in total. Particularly by arranging the third lens unit of negative refractive power, the degree of freedom of the refractive power arrangement of the two lens units of positive refractive power arranged on the object side to allow for good correction of the various aberrations at the design magnification. Further, by strengthening the overall refractive power of these two lens units, the total focusing movement of the three lens units is reduced to achieve a minimization of the total length of the lens.

And, when focusing from an infinitely distant object to a nearby object, the front three lens units I, II and III are axially moved forward independently of one another in such relation that any of the three air separations between the successive two lens units increases, or the so-called "floating" is carried out.

Thereby, compared with the case when two or three of the lens units are moved merely as a unit to effect floating, the variation of aberrations with variation of the magnification is further lessened to make it possible to perform good aberration correction over not only the normal but also the closeup range.

A particular emphasis is laid on improvement of the aberration correction in the closeup range up to life-size or larger.

Another feature is that the use of the fourth lens unit of positive power provides a possibility of increasing the degree of freedom of the refractive powers of the first, second and third lens units to allow for increase of the refractive power of the third lens unit. With this, the total focusing movement of this lens is minimized to stabilize the transverse chromatic aberration produced from the third lens unit.

To achieve a further improvement of the stabilization of the aberration correction throughout the extended focusing range, the following conditions are set forth:

$$0.8 < f_2/f < 0.9 \tag{1}$$

$$-4.2 < f_3/f < -1.8 \tag{2}$$

$$1.03 < m_1/m_2 < 1.1 \tag{3}$$

$$0.2 \leq m_3/m_2 < 0.55 \tag{4}$$

where $f_2$ and $f_3$ are the focal lengths of the second and third lens units respectively, f is the overall focal length of the entire lens system, and $m_1$, $m_2$ and $m_3$ are the total focusing movements of the first, second and third lens units respectively.

The inequalities of condition (1) concern the refractive power of the second lens unit, and the inequalities of condition (2) concern the refractive power of the third lens unit. In any case, when the condition is satisfied, the total focusing movement falls in a proper range.

When the refractive power of the second lens unit weakens beyond the upper limit of the condition (1), its total focusing movement is caused to become too large. When the lower limit is exceeded, though the focusing movement is reduced, variation of aberrations, particularly spherical aberration, with variation of the magnification is increased.

When the negative refractive power of the third lens unit becomes too strong beyond the upper limit of the condition (2), the refractive powers of the two lenses on the object side of it have to be strengthened in proportion thereto. Though the total focusing movement of each of these lenses decreases, variation of the aberrations is increased. Therefore, it becomes more difficult to perform good correction of aberrations. When the negative refractive power of the third lens unit weakens beyond the lower limit, the technical significance of using the third lens unit is lessened, for the required total focusing movements of the first two lens units increase objectionably.

The inequalities of condition (3) concern the moving ratio of the first and second lens units, and the inequalities of condition (4) concern the moving ratio of the second and third lens units. In any case, by setting forth a proper range for the total focusing movement of each lens unit, a good stability of aberration correction is achieved over the entire range of magnifications.

Particularly the good correction of spherical aberration and outward coma is stabilized throughout. In this connection it should be explained that, since, as focusing from infinity to the minimum object distance, the separation between the first and second lens units and the separations between the second and third lens units both are increased, because the height of incidence of the off-axis light pencil on the second lens unit increases, for it is strongly refracted to produce inward coma, this cancels the outward coma produced in the closeup range.

The on-axis light pencil, on the other hand, becomes strong in divergence in the space between the first and second lens units, as the object distance decreases. If the moving ratios of the successive two of the lens units are taken at too large values, under-correction of spherical aberration will therefore result. So, in this embodiment, ranges as specified by the inequalities of conditions (3) and (4) are given for them to achieve good-balance correction of coma and spherical aberration.

When the spacing between the first and second lens units becomes too long beyond the upper limit of the inequalities of condition (3), though the outward coma can be corrected well, the spherical aberration will be under-corrected. When the spacing between the first and second lens units is hindered from increasing in excess of a certain value corresponding to the lower limit, insufficient correction of outward coma will result.

When the spacing between the second and third lens units is hindered from increasing in excess of a certain value corresponding to the upper limit of the inequalities of condition (4), insufficient correction of coma will result. When the spacing between the second and third lens units becomes too large beyond the lower limit, the focal length of the entire system shifts toward shorter values, and the total focusing movement of each of the lenses decreases. But, the difficulty of correcting aberrations increases. Further, because the focusable distance shortens, such a violation is objectionable.

It is to be noted that, in this embodiment, the diaphragm is arranged in the space between the first and second lens unit to axially move along with the second lens unit. This causes a large variation of the height of incidence of the on-axis pencil on the fourth lens unit for infinitely distant and nearby objects, thus giving an advantage that the variation of the aberrations with variation of the magnification is reduced.

To achieve good correction of image aberrations over the entire area of the picture format, it is preferred that, from front to rear, the first lens unit is constructed with a positive lens, a positive meniscus lens and a negative lens, or three in total, the second lens unit with a cemented doublet of a negative lens and a positive lens, and a positive lens, or in the form of two groups with three elements, the third lens unit with a negative meniscus lens and the fourth lens unit with at least one positive lens.

Three examples of specific lenses of the invention can be constructed in accordance with the numerical data given in the following tables for the radii of curvature, R, the axial thicknesses of air separations, D, and the refractive indices, N, and Abbe numbers $\nu$, of the glasses of the various elements with the subscriptions numbered consecutively from front to rear. The unit is in mm.

| Numerical Example 1 | | |
| --- | --- | --- |
| F = 51.0 | FNO = 1:2.55 | 2ω = 46.0° |
| R1 = 246.54 | D1 = 2.20 | N1 = 1.72000  ν1 = 50.2 |
| R2 = −81.01 | D2 = 0.15 | |
| R3 = 22.17 | D3 = 2.85 | N2 = 1.78590  ν2 = 44.2 |
| R4 = 58.52 | D4 = 0.99 | |
| R5 = −602.47 | D5 = 1.46 | N3 = 1.60342  ν3 = 38.0 |
| R6 = 18.25 | D6 = Variable | |
| R7 = Stop | D7 = 3.00 | |
| R8 = −15.31 | D8 = 2.52 | N4 = 1.68893  ν4 = 31.1 |
| R9 = −139.71 | D9 = 3.50 | N5 = 1.71300  ν5 = 53.8 |
| R10 = −19.65 | D10 = 0.15 | |
| R11 = 330.52 | D11 = 2.98 | N6 = 1.77250  ν6 = 49.6 |
| R12 = −39.86 | D12 = Variable | |
| R13 = 47.67 | D13 = 1.60 | N7 = 1.51633  ν7 = 64.1 |
| R14 = 32.30 | D14 = Variable | |
| R15 = 325.73 | D15 = 1.80 | N8 = 1.48749  ν8 = 70.2 |

-continued

Numerical Example 1

R16 = −768.13

| | Infinitely Distant Object | Nearby Object $\beta = -1.0$ |
|---|---|---|
| D6 | 6.05 | 8.36 |
| D12 | 0.88 | 23.97 |
| D14 | 4.15 | 27.25 |

Numerical Example 2

F = 51.6  FNO = 1:2.55  2ω = 45.5°

| | | |
|---|---|---|
| R1 = 253.43 | D1 = 2.20 | N1 = 1.72000  ν1 = 50.2 |
| R2 = −82.08 | D2 = 0.15 | |
| R3 = 22.17 | D3 = 2.85 | N2 = 1.78590  ν2 = 44.2 |
| R4 = 59.58 | D4 = 0.99 | |
| R5 = −612.18 | D5 = 1.46 | N3 = 1.60342  ν3 = 38.0 |
| R6 = 18.19 | D6 = Variable | |
| R7 = Stop | D7 = 3.00 | |
| R8 = −15.32 | D8 = 2.52 | N4 = 1.68893  ν4 = 31.1 |
| R9 = −139.61 | D9 = 3.50 | N5 = 1.71300  ν5 = 53.8 |
| R10 = −19.62 | D10 = 0.15 | |
| R11 = 352.18 | D11 = 2.98 | N6 = 1.77250  ν6 = 49.6 |
| R12 = −39.98 | D12 = Variable | |
| R13 = 45.82 | D13 = 1.60 | N7 = 1.60311  ν7 = 60.7 |
| R14 = 32.95 | D14 = Variable | |
| R15 = 444.57 | D15 = 1.80 | N8 = 1.48749  ν8 = 70.2 |
| R16 = −607.46 | | |

| | Infinitely Distant Object | Nearby Object $\beta = -1.0$ |
|---|---|---|
| D6 | 6.05 | 8.36 |
| D12 | 0.88 | 23.97 |
| D14 | 4.15 | 27.25 |

Numerical Example 3

F = 51.0  FNO = 1:2.55  2ω = 46.0°

| | | |
|---|---|---|
| R1 = 210.99 | D1 = 2.20 | N1 = 1.72000  ν1 = 50.2 |
| R2 = −81.05 | D2 = 0.15 | |
| R3 = 22.26 | D3 = 2.85 | N2 = 1.78590  ν2 = 44.2 |
| R4 = 64.33 | D4 = 0.99 | |
| R5 = −365.00 | D5 = 1.46 | N3 = 1.60342  ν3 = 38.0 |
| R6 = 17.73 | D6 = Variable | |
| R7 = Stop | D7 = 3.00 | |
| R8 = −15.38 | D8 = 2.52 | N4 = 1.68893  ν4 = 31.1 |
| R9 = −192.63 | D9 = 3.50 | N5 = 1.71300  ν5 = 53.8 |
| R10 = −19.80 | D10 = 0.15 | |
| R11 = 230.27 | D11 = 2.98 | N6 = 1.77250  ν6 = 49.6 |
| R12 = −38.91 | D12 = Variable | |
| R13 = 98.76 | D13 = 1.60 | N7 = 1.51633  ν7 = 64.1 |
| R14 = 33.67 | D14 = Variable | |
| R15 = 57.93 | D15 = 2.50 | N8 = 1.48749  ν8 = 70.2 |
| R16 = 197.10 | | |

| | Infinitely Distant Object | Nearby Object $\beta = -1.0$ |
|---|---|---|
| D6 | 6.05 | 7.43 |
| D12 | 0.88 | 30.83 |
| D14 | 4.15 | 18.71 |

Figure 6:
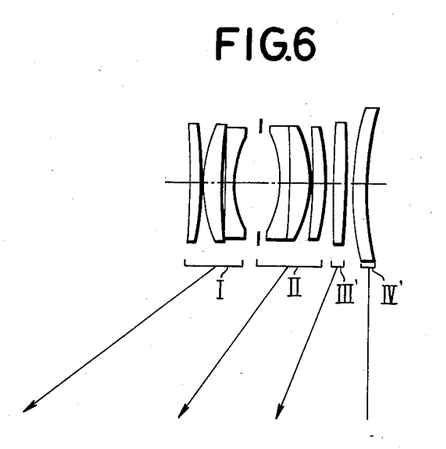
FIGS. 6 and 7 are longitudinal section views of numerical examples 4 and 6 of lenses of the invention.
Figure 7:
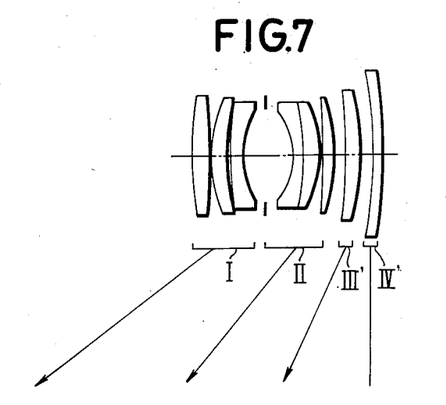
Figure 8A:
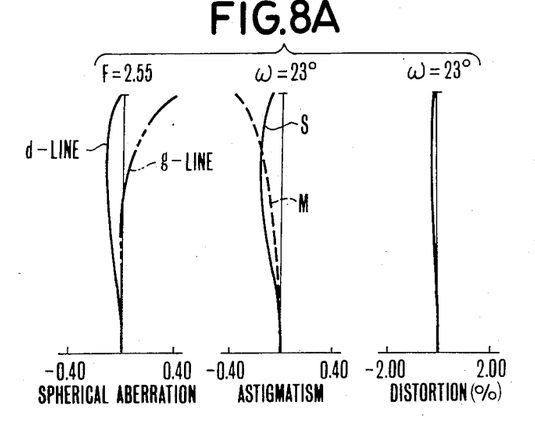
FIGS. 8A and 8B, 9A and 9B, and 10A and 10B are graphic representations of the aberrations of numerical examples 4, 5 and 6 of the invention respectively.
Figure 8B:
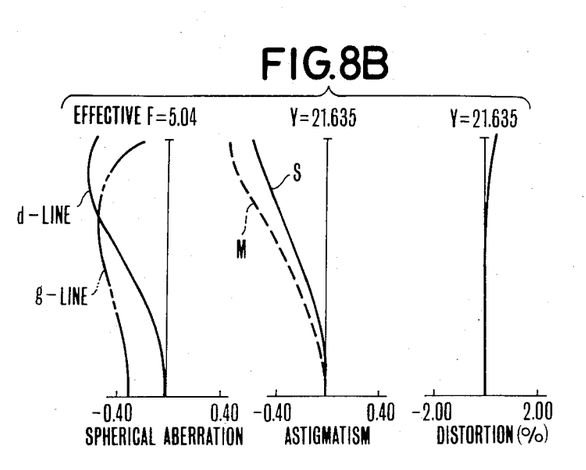
Figure 9A:
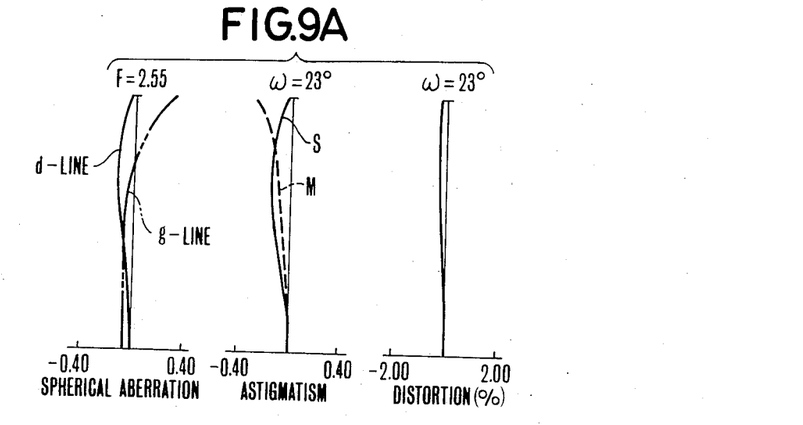
Figure 9B:
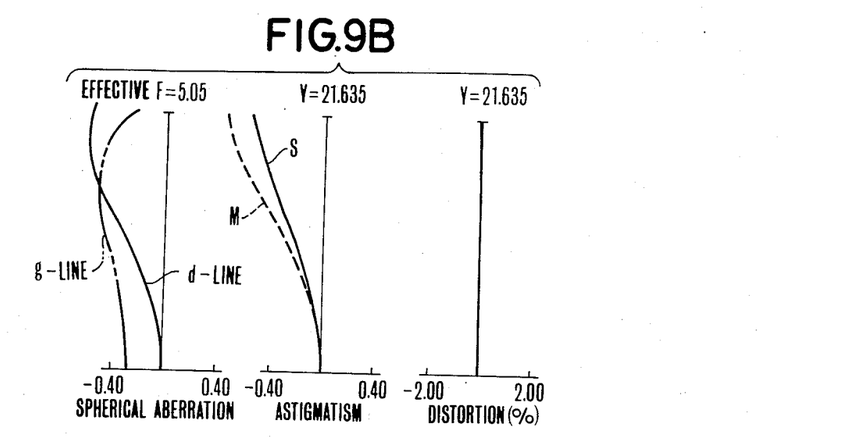
Figure 10A:
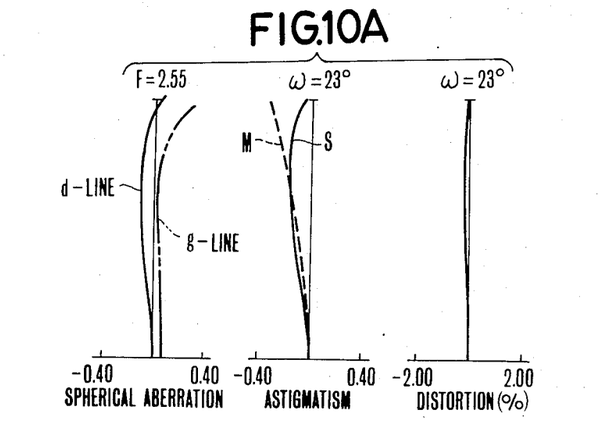
Figure 10B:
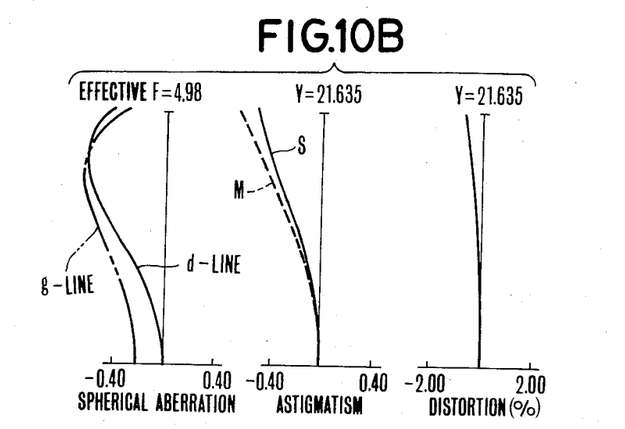

FIGS. 6 and 7 are lens block diagrams illustrating another embodiment of the invention. In the drawings, I, II and III' denote the first, second and third lens units, each of which is of positive power. IV' is the fixed fourth lens unit of negative power. Also, the arrows in the drawings indicate the directions in which the respective lens units move axially when focusing from an infinitely distant object to a nearby object.

In this embodiment, as has been described above, on the object side there are arranged three or first, second and third lens units I, II and III' of positive powers, and, in their rear, there is arranged the fourth lens unit IV' of negative refractive power, thus constituting a Gauss type photographic lens with the four lens units in total. Particularly, by using the fourth lens unit IV' of negative refractive power, the degree of freedom of the refractive power arrangement of the three lens units of positive power arranged on the object side is increased to perform good correction of various aberration at the design magnification. Further, by strengthening the positive power of the entirety of the first three lens units, the overall total focusing movement of the three lens units is reduced to achieve a shortening of the total length of the lens.

And, the so-called "floating" method is employed in such a way that when focusing is effected from an infinitely distant object to a nearby object, the front three lens units I, II and III' are axially moved forward independently of one another, while simultaneously increasing any of all the air separations between the successive two lens units.

Further, in this embodiment, to achieve good stability of aberration correction throughout the entire focusing range, it is preferred to satisfy the following various conditions:

$$1.1 < f_2/f < 1.25 \tag{5}$$

$$6.0 < f_4/f < -3.9 \tag{6}$$

$$1.1 < m_1/m_2 < 1.18 \tag{7}$$

$$0.5 \leqq m_3/m_2 < 0.8 \tag{8}$$

where $f_2$ and $f_4$ are the focal lengths of the second and four lens units respectively, f is the focal length of the entire system, and $m_1$, $m_2$ and $m_3$ are the total focusing movements of the first, second and third lens units respectively.

The inequalities of condition (5) concern the refractive power of the second lens unit, and the inequalities of condition (6) concern the refractive power of the fourth lens unit. Any of these ranges is given for setting a proper focusing movement of the lens unit.

When the refractive power of the second lens unit weakens beyond the upper limit of condition (5), the total focusing movement becomes too long. When the refractive power is too strong beyond the lower limit, though the movement decreases, variation of aberrations particularly spherical aberration with variation of the magnification is increased.

When the negative power of the fourth lens unit becomes too strong beyond the upper limit of condition (6), the refractive powers of the front three lens units must be strengthened at respective rates. Though the focusing movement of each of these lenses decreases, the variation of aberrations is increased. Therefore, a good stability of aberration correction is more difficult to perform. When the negative refractive power of the fourth lens unit weakens beyond the lower limit, the technical significance of using the fourth lens unit is lessened, and the total focusing movement of each of the front three lens units is increased objectionably.

The inequalities of condition (7) concern the moving ratio of the first and second lens units, and the inequalities of condition (8) concern the moving ratio of the second and third lens units. Any of these ranges are given for setting a proper total focusing movement of each lens unit to perform a good stability of aberration correction throughout the focusing range.

A particular emphasis is laid on the stabilization of spherical aberration and outward coma.

The amount of varied spacing between the first and second lens units during the focusing from infinity to the minimum object distance, and the amount of varied spacing between the second and third lens units are so much increased that the off-axis pencil is made incident on the second lens unit at a higher height. Because it then refracts strongly, inward coma is produced to cancel the outward coma produced in the closeup range.

Meanwhile, the on-axis when in the closeup range comes to diverge strongly in the space between the first and second lens unit. If the moving ratio of each pair of the lens units is taken at too large a value, therefore, under-correction of spherical aberration will result. So, the invention in this embodiment sets forth the rules of design for them as by the inequalities (7) and (8) to permit correction of the spherical aberration and coma in good balance.

When the spacing between the first and second lens units becomes too long beyond the upper limit of condition (7), though the outward coma can be corrected well, the spherical aberration will be under-corrected. When the spacing between the first and second lens units is prohibited from increasing beyond a certain value corresponding to the lower limit, the outward coma cannot be corrected sufficiently.

When the spacing between the second and third lens units is prohibited from increasing beyond a certain value corresponding to the upper limit of condition (8), insufficient correction of coma will result. When it becomes too long beyond the lower limit, the focal length of the entire system is too much shifted toward longer values. Therefore, the total focusing movement of each of the lens units must be increased. This will result in an unduly large increase of the total length of the lens.

For note, in this embodiment, it is preferred to arrange the diaphragm in the space between the first and second lens unit to axially move along with the latter during focusing, for the variation of aberrations with variation of the magnificaion is reduced, because the height of incidence of the on-axis pencil on the fourth lens unit varies largely for distant and nearby objects.

Also, to achieve good correction of various image aberrations over the entire area of the picture format, it is preferred in this embodiment that the first lens unit is constructed with, from front to rear, a positive lens, another positive lens of meniscus form and a negative lens, the second lens unit in the form of two groups with three elements, or a double of negative and positive lenses cemented together and a positive lens, the third lens unit with at least one positive lens, and the fourth lens unit with a negative lens of meniscus form.

Numerical Example 4

F = 51.6  FNO = 1:2.55  2ω = 45.5°

| | | |
|---|---|---|
| R1 = −531.25 | D1 = 2.23 | N1 = 1.72000  ν1 = 50.2 |
| R2 = −61.75 | D2 = 0.15 | |
| R3 = 22.00 | D3 = 3.04 | N2 = 1.78590  ν2 = 44.2 |
| R4 = 78.06 | D4 = 1.05 | |
| R5 = −137.25 | D5 = 1.19 | N3 = 1.60342  ν3 = 38.0 |
| R6 = 19.00 | D6 = Variable | |
| R7 = Stop | D7 = 4.05 | |
| R8 = −16.21 | D8 = 1.62 | N4 = 1.69895  ν4 = 30.1 |
| R9 = −85.24 | D9 = 3.71 | N5 = 1.77250  ν5 = 49.6 |
| R10 = −19.66 | D10 = 0.15 | |
| R11 = −139.17 | D11 = 2.52 | N6 = 1.77250  ν6 = 49.6 |
| R12 = −40.93 | D12 = Variable | |
| R13 = 346.13 | D13 = 2.53 | N7 = 1.48749  ν7 = 70.2 |
| R14 = −120.56 | D14 = Variable | |
| R15 = 58.13 | D15 = 1.82 | N8 = 1.51633  ν8 = 64.1 |
| R16 = 40.90 | | |

| | Object ∞ | Magnification −1 |
|---|---|---|
| D6 | 4.55 | 10.60 |
| D12 | 1 | 12.46 |
| D14 | 1 | 37.54 |

Numerical Example 5

F = 50.4  FNO = 1:2.55  2ω = 46.5°

| | | |
|---|---|---|
| R1 = −325.25 | D1 = 2.20 | N1 = 1.72000  ν1 = 50.2 |
| R2 = −59.14 | D2 = 0.15 | |
| R3 = 21.27 | D3 = 3.24 | N2 = 1.77250  ν2 = 49.6 |
| R4 = 77.63 | D4 = 0.97 | |
| R5 = −133.47 | D5 = 1.50 | N3 = 1.60562  ν3 = 43.7 |
| R6 = 18.75 | D6 = Variable | |
| R7 = Stop | D7 = 3.80 | |
| R8 = −16.41 | D8 = 1.67 | N4 = 1.75520  ν4 = 27.5 |
| R9 = −59.43 | D9 = 3.65 | N5 = 1.77250  ν5 = 49.6 |
| R10 = −19.40 | D10 = 0.15 | |
| R11 = −258.63 | D11 = 2.40 | N6 = 1.77250  ν6 = 49.6 |
| R12 = −40.59 | D12 = Variable | |
| R13 = 150.63 | D13 = 1.90 | N7 = 1.65844  ν7 = 50.9 |
| R14 = −899.48 | D14 = Variable | |
| R15 = 62.71 | D15 = 1.75 | N8 = 1.62299  ν8 = 58.2 |
| R16 = 43.02 | | |

| | Object ∞ | Magnification −1 |
|---|---|---|
| D6 | 4.2 | 10.6 |
| D12 | 0.8 | 24.1 |
| D14 | 0.8 | 26.1 |

Numerical Example 6

F = 51.61  FNO = 1:2.55  2ω = 45.5°

| | | |
|---|---|---|
| R1 = 65.20 | D1 = 2.80 | N1 = 1.78590  ν1 = 44.2 |
| R2 = −646.44 | D2 = 0.15 | |
| R3 = 20.20 | D3 = 2.97 | N2 = 1.80610  ν2 = 40.9 |
| R4 = 44.49 | D4 = 0.70 | |
| R5 = 84.16 | D5 = 2.07 | N3 = 1.69895  ν3 = 30.1 |
| R6 = 15.86 | D6 = Variable | |
| R7 = Stop | D7 = 5.00 | |
| R8 = −13.84 | D8 = 1.97 | N4 = 1.72825  ν4 = 28.5 |
| R9 = −40.00 | D9 = 2.86 | N5 = 1.78590  ν5 = 44.2 |
| R10 = −17.84 | D10 = 0.15 | |
| R11 = −117.46 | D11 = 2.30 | N6 = 1.77250  ν6 = 49.6 |
| R12 = −31.52 | D12 = Variable | |
| R13 = −75.60 | D13 = 2.50 | N7 = 1.48749  ν7 = 70.2 |
| R14 = −44.81 | D14 = Variable | |
| R15 = −64.38 | D15 = 1.60 | N8 = 1.53172  ν8 = 48.9 |
| R16 = −117.76 | | |

| | Object ∞ | Magnification −1 |
|---|---|---|
| D6 | 4 | 11.2 |
| D12 | 2 | 24.0 |
| D14 | 2 | 28.0 |

What is claimed is:

1. A photographic lens comprising, from front to rear, a first lens unit of positive refractive power, a second lens unit of positive refractive power, a third lens unit and a fourth lens unit, one of said third and said fourth lens units being of positive refractive power, and the other being of negative refractive power, wherein when focusing is performed from an infinitely distant object to a nearby object, said first, said second and said third lens units are axially moved forward in such relation that any of the three axial separations between the successive two lens units increases, while said fourth lens unit being held stationary.

2. A photographic lens according to claim 1, wherein the one of said third and said fourth lens units which has the negative refractive power is in meniscus form.

3. A photographic lens according to claim 2, wherein said third lens unit is in meniscus form of forward convexity.

4. A photographic lens according to claim 2, wherein said fourth lens unit is in meniscus form.

5. A photographic lens according to claim 2, wherein said lens unit having the negative refractive power is a singlet lens.

6. A photographic lens according to claim 1, wherein said first to said fourth lens units constitute a Gauss type lens.

7. A photographic lens according to claim 6, further comprising a diaphragm in the space between said first and said second lens units.

8. A photographic lens according to claim 1, wherein said first, said second and said third lens units are axially movable for focusing on an object with its image of 1:1 magnification.

9. A photographic lens comprising, from front to rear, a first lens unit of positive refractive power, a second lens unit of positive refractive power, a third lens unit and a fourth lens unit, one of said third and said fourth lens units having a positive refractive power, and the other having a negative refractive power and including a negative meniscus lens, in which when focusing is performed from an infinitely distant object to a nearby object, said first, said second and said third lens units are axially moved forward in such relation that any of the three axial separations between the successive two lens units increases.

10. A photographic lens according to claim 9, wherein said first to said fourth lens units constitute a Gauss type lens with a diaphragm in the space between said first and said second lens units.

11. A photographic lens according to claim 9, wherein said first, said second and said third lens units are axially movable for focusing on an object with its image of 1:1 magnification.

12. A photographic lens according to claim 9, wherein said third lens unit has a negative refractive power.

13. A photographic lens according to claim 9, wherein said fourth lens unit has a negative refractive power.

14. A photographic lens comprising, from front to rear, a first lens unit of positive refractive power, a second lens unit of positive refractive power, a third lens unit of negative refractive power and a fourth lens unit of positive refractive power, wherein the following conditions are satisfied:

$$0.8 < f_2/f < 0.9$$

$$-4.2 < f_3/f < -1.8$$

$$1.03 < m_1/m_2 < 1.1$$

$$0.2 \leq m_3/m_2 < 0.55$$

where $f_2$ and $f_3$ are the focal lengths of said second and said third lens units respectively, f is the focal length of the entire system, and $m_1$, $m_2$ and $m_3$ are the total focusing movements of said first, said second and said third lens units, respectively; and, wherein when focusing is performed from an infinitely distant object to a nearby object, said fourth lens unit is held stationary while said first, said second and said third lens units are axially moved forward in such relation that the three axial separations increase between successive pairs of said lens units.

15. The photographic lens according to claim 14, wherein said third lens unit is in meniscus form of forward convexity.

16. A photographic lens comprising, from front to rear, a first lens unit of positive refractive power, a second lens unit of positive refractive power, a third lens unit of positive refractive power and a fourth lens unit of negative refractive power, wherein the following conditions are satisfied:

$$1.1 < f_2/f < 1.25$$

$$-6.0 < f_4/f < -3.9$$

$$1.1 < m_1/m_2 < 1.18$$

$$0.5 \leq m_3/m_2 < 0.8$$

where $f_2$ and $f_4$ are the focal lengths of said second and said fourth lens units respectively, f is the focal length of the entire system, and $m_1$, $m_2$ and $m_3$ are the total focusing movements of said first, said second and said third lens units respectively; and, wherein when focusing is performed from an infinitely distant object to a nearby object, said fourth lens unit is held stationary while said first, said second and said third lens units are axially moved forward in such relation that any of the three axial separations increase between successive pairs of said lens units.

17. The photographic lens according to claim 16, wherein said fourth lens is in meniscus form.

* * * * *

UNITED STATES PATENT AND TRADEMARK OFFICE
CERTIFICATE OF CORRECTION

PATENT NO. : 4,807,983
DATED : February 28, 1989
INVENTOR(S) : TAKASHI MATSUSHITA It is certified that error appears in the above-identified patent and that said Letters Patent is hereby corrected as shown below:

Cover page,

[21], "7,621" should read --7,626--.

Column 2, line 43, "to" should be deleted.

Column 4, line 38, "three in" should read --three lenses in--;

line 47, "of" should read --or--.

Column 6, line 33, "four" should read --fourth--.

Signed and Sealed this

Eighth Day of August, 1989

Attest:

DONALD J. QUIGG

Attesting Officer      Commissioner of Patents and Trademarks